(12) United States Patent  
Utsunomiya et al.

(10) Patent No.: US 8,379,545 B2  
(45) Date of Patent: *Feb. 19, 2013

(54) COMMUNICATION METHOD, COMMUNICATION APPARATUS, AND COMMUNICATION SYSTEM

(75) Inventors: Yoriko Utsunomiya, Tokyo (JP); Masahiro Takagi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1341 days.

This patent is subject to a terminal disclaimer.

(21) Appl. No.: 12/076,730

(22) Filed: Mar. 21, 2008

(65) Prior Publication Data

US 2008/0181152 A1    Jul. 31, 2008

Related U.S. Application Data

(62) Division of application No. 10/948,542, filed on Sep. 24, 2004, now Pat. No. 7,369,511.

(30) Foreign Application Priority Data

Jan. 9, 2004 (JP) ................................ 2004-004846

(51) Int. Cl.  
*H04L 12/28* (2006.01)

(52) U.S. Cl. ........................................ 370/262; 370/329

(58) Field of Classification Search .................. 370/329, 370/262  
See application file for complete search history.

(56) References Cited

U.S. PATENT DOCUMENTS

| | | | |
|---|---|---|---|
| 6,760,882 B1 | 7/2004 | Gesbert et al. | |
| 7,369,511 B2 * | 5/2008 | Utsunomiya et al. | 370/252 |
| 2002/0039884 A1 | 4/2002 | Raynes et al. | |
| 2003/0036359 A1 | 2/2003 | Dent et al. | |
| 2003/0236069 A1 * | 12/2003 | Sakata et al. | 455/11.1 |
| 2005/0007947 A1 | 1/2005 | Abe et al. | |
| 2007/0217539 A1 * | 9/2007 | Ihm et al. | 375/267 |
| 2009/0103666 A1 * | 4/2009 | Zhao et al. | 375/341 |
| 2009/0290654 A1 * | 11/2009 | Yu et al. | 375/267 |

FOREIGN PATENT DOCUMENTS

| | | |
|---|---|---|
| JP | 2002-290246 | 10/2002 |
| JP | 2003-069531 | 3/2003 |
| WO | WO 01/33761 A1 | 5/2001 |

OTHER PUBLICATIONS

Notification of the First Office Action dated Apr. 13, 2007, from Chinese Patent Office in Chinese Patent Application No. 200510004133.7, and English translation thereof.

Lau et al, "On the Design of MIMO Block-Fading Channels With Feedback-Link Capacity Constraint," IEEE Transactions on Communications (Jan. 2004), 52:62-70.

European Search Report issued by the European Patent Office Apr. 13, 2005, in European Application No. 05250025.3-1237.

* cited by examiner

*Primary Examiner* — Sai-Ming Chan  
(74) *Attorney, Agent, or Firm* — Finnegan, Henderson, Farabow, Garrett & Dunner, L.L.P.

(57) ABSTRACT

A method for exchanging channel information between a transmitter and a receiver each including antennas. A request frame including a first preamble, second preamble, and channel information feedback request is transmitted to the receiver, wherein the first preamble is transmitted from one of the antennas of the transmitter, the second preamble is transmitted from each of the antennas, and the channel information feedback request is transmitted from the one of the antennas. The request frame is received at the receiver, and the channel information feedback request is detected by a decoding based on the first preamble. Channel information is estimated using the second preamble, and a notification frame including the estimated information is constructed and transmitted to the transmitter.

13 Claims, 5 Drawing Sheets

COMMUNICATION METHOD, COMMUNICATION APPARATUS, AND COMMUNICATION SYSTEM

CROSS-REFERENCE TO RELATED APPLICATIONS

This is a division of application Ser. No. 10/948,542, filed Sep. 24, 2004, now U.S. Pat. No. 7,369,511, which is incorporated herein by reference.

This application is based upon and claims the benefit of priority from prior Japanese Patent Application No. 2004-004846, filed Jan. 9, 2004, the entire contents of which are incorporated herein by reference.

BACKGROUND OF THE INVENTION

1. Field of the Invention

The present invention relates to a communication method, apparatus, and system which feed back channel estimation information to a counterpart apparatus and, more particularly, to exchange of channel estimation information associated with MIMO (Multi Input Multi Output).

2. Description of the Related Art

A MIMO technique of transmitting frames by using a plurality of antennas has recently received a great deal of attention. A wireless communication system using the MIMO technique can realize high speed transmission without extending frequency bandwidth. MIMO is likely to be employed also in a wireless LAN standard IEEE802.11n which has currently been standardized. Particularly in the LOS (Line Of Sight) propagation environment, the channel state of each path may not be estimated even by a signal process on the receiver in a wireless communication system using MIMO. In this case, a data frame that is transmitted by using a plurality of antennas may not be able to be decoded on the receiver. One of the causes is that the channel state from the transmitter to the receiver is not obtained on the transmitter. If the transmitter does not know the condition of the received data on the receiver, the transmitter may transmit a frame using antennas by which the receiver may not correctly decode information. As a result, the band is wasted, which inhibits another communication.

To solve this problem, the transmitter may specify an antenna configuration used for transmission according to the channel state, and then transmits data so as to allow the receiver to decode information correctly.

For example, there is known a technique of feeding back information on a channel state estimated on the receiver to the transmitter and selecting a transmission method by the transmitter according to the channel state. This technique includes a method of switching a modulation scheme on the transmitter on the basis of channel information fed back from the receiver (see Jpn. Pat. Appln. KOKAI Publication No. 2002-290246), and a method of controlling the coding ratio (see Jpn. Pat. Appln. KOKAI Publication No. 2003-69531).

Feedback of channel estimation information for proper control of transmission using MIMO on the transmitter requires a technique unlike conventional communication using one antenna. For example, when a conventional technique is simply applied, frames are sequentially transmitted from a plurality of antennas one by one on the transmitter. The receiver measures the channel state for each antenna, and feeds it back to the transmitter. However, according to this method, the channel resource is greatly wasted depending on the number of antennas, and this feedback method is too complicated.

BRIEF SUMMARY OF THE INVENTION

According to one aspect of the present invention, there is provided a method for exchanging channel information between a transmitter and a receiver each including antennas. A request frame including a first preamble, second preamble, and channel information feedback request is transmitted to the receiver, wherein the first preamble is transmitted from one of the antennas of the transmitter, the second preamble is transmitted from each of the antennas, and the channel information feedback request is transmitted from the one of the antennas. The request frame is received at the receiver, and the channel information feedback request is detected by a decoding based on the first preamble. Channel information is estimated using the second preamble, and a notification frame including the estimated information is constructed and transmitted to the transmitter.

DETAILED DESCRIPTION OF THE INVENTION

First Embodiment

Figure 1:
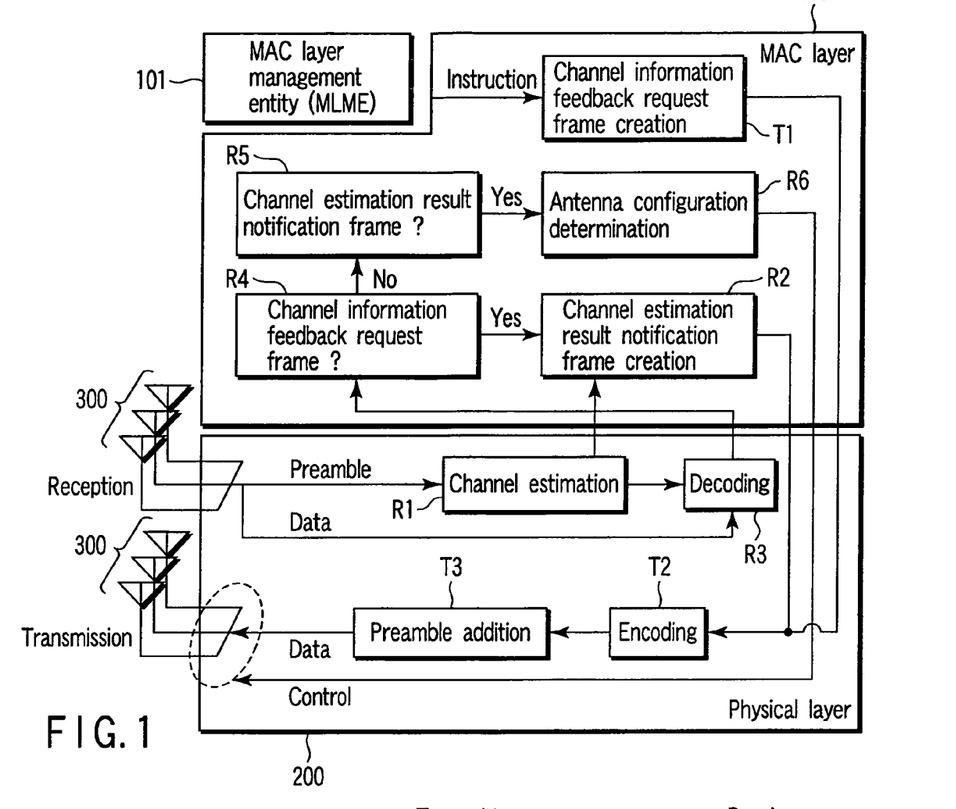
FIG. 1 is a block diagram showing a communication apparatus according to embodiments of the present invention.

FIG. 1 is a block diagram showing a communication apparatus according to the first embodiment of the present invention. The communication apparatus comprising a communication system according to the first embodiment, in turn comprises a MAC layer processing unit 100 and physical layer processing unit 200. These processing units are implemented as analog or digital electronic circuits in accordance with the packaging design, or firmware executed by a CPU assembled into an LSI. In this communication apparatus, the physical layer processing unit 200 is coupled to, e.g., three antennas 300. As shown in FIG. 1, the MAC layer processing unit 100 has a MAC layer management entity (MLME) 101. The MAC layer processing unit 100 also has a function T1 of creating a channel information feedback request frame to be transmitted to a counterpart apparatus according to an instruction from the MAC layer management entity 101. A MAC frame such as the channel information feedback request frame created in the MAC layer processing unit 100 is sent to the physical layer processing unit 200. The physical layer processing unit 200 has a function T2 of encoding a MAC frame, and a function T3 of adding a preamble to the encoded data to generate a physical frame. The generated physical frame is transmitted from the antennas 300.

The physical layer processing unit 200 has a function R1 of estimating the channel state on the basis of a preamble received by the antenna 300 upon reception, and a function R3 of decoding data on the basis of the channel estimation. The channel estimation result is used by a channel estimation result notification frame creation function R2 in the MAC layer processing unit 100. The MAC layer processing unit 100 has a function R4 of determining, for data decoded by the function R3, whether the received frame is a channel information feedback request frame, and a function R5 of determining whether the received frame is a channel estimation result notification frame. If the received frame is a channel information feedback request frame, a channel estimation result notification frame is created by the function R2 and transmitted to the channel information requesting side. If the received frame is a channel estimation result notification frame, an antenna configuration used to transmit data to at least a communication apparatus which has transmitted this frame are determined (function R6). The antenna configuration determined by R6 is sent to the encoding function T2 to control transmission operation. An example of a method of determining antenna configuration by function R6 will be described later.

The communication system according to the first embodiment of the present invention assumes a wireless LAN system employing a MIMO communication mode. A communication terminal (to be referred to as a MIMO terminal hereinafter) adopted in this communication system can process a format used in the IEEE802.11a communication mode. The IEEE802.11a communication mode corresponds to a first physical layer protocol, and the MIMO communication mode correspond to a second physical layer protocol.

Figures 2, 3:
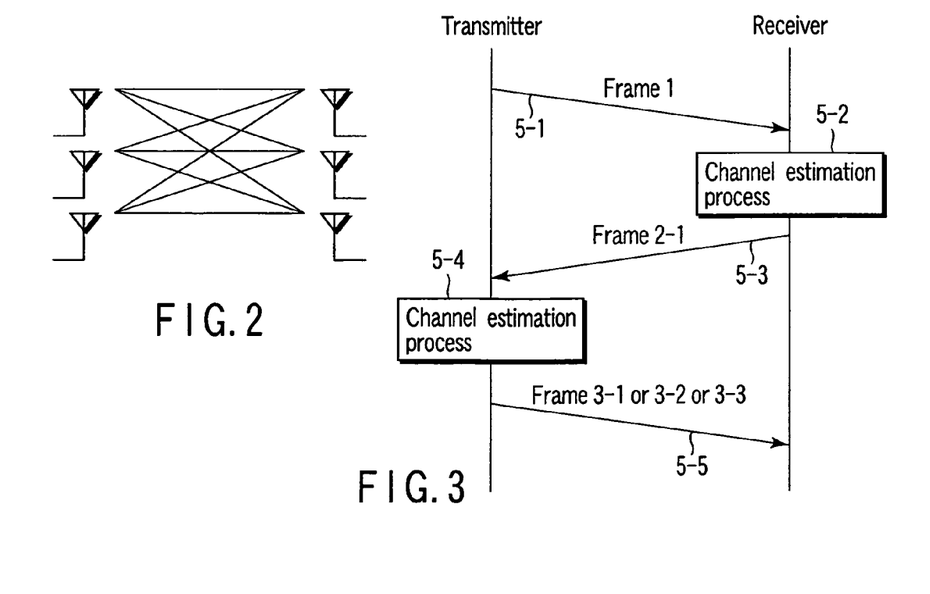
FIG. 2 is a view showing an example of a MIMO channel in a communication system according to the embodiments of the present invention.
FIG. 3 is a chart showing an example of a communication sequence according to the first embodiment of the present invention.

FIG. 2 is a view showing an example of a MIMO channel in the communication system according to the first embodiment of the present invention. As shown in FIG. 2, the first embodiment of the present invention prepares three antennas 300 to form a matrix channel (MIMO channel). The transmitter receives different information from the three antennas 300. The receiver receives signals multiplexed by the antennas 300, and decodes the received information by a signal process.

The first embodiment assumes that the matrix channel is a wireless channel. It is therefore difficult for the transmitter to know the condition of the received data on the receiver without feeding back channel estimation result information from the receiver because the channel state greatly varies.

A mechanism of feeding back channel estimation result information to the transmitter in the wireless communication system using a MIMO terminal will be explained in accordance with the communication sequence of FIG. 3. Channel information is fed back from the receiver to the transmitter mainly when communication starts or the communication quality degrades. Channel information may be fed back periodically.

As shown in FIG. 3, the communication sequence comprises a first step 5-1 of transmitting channel information feedback request frame 1 from the transmitter to the receiver, a second step 5-2 of estimating a channel by the receiver on the basis of channel information feedback request frame 1, a third step 5-3 of notifying the transmitter by frame 2-1 of a channel estimation result on the receiver, a fourth step 5-4 of estimating a channel by the transmitter on the basis of frame 2-1, and a fifth step 5-5 of transmitting any one of channel estimation result notification frames 3-1, 3-2, and 3-3 as the channel estimation result of the transmitter from the transmitter to the receiver.

Figure 4:
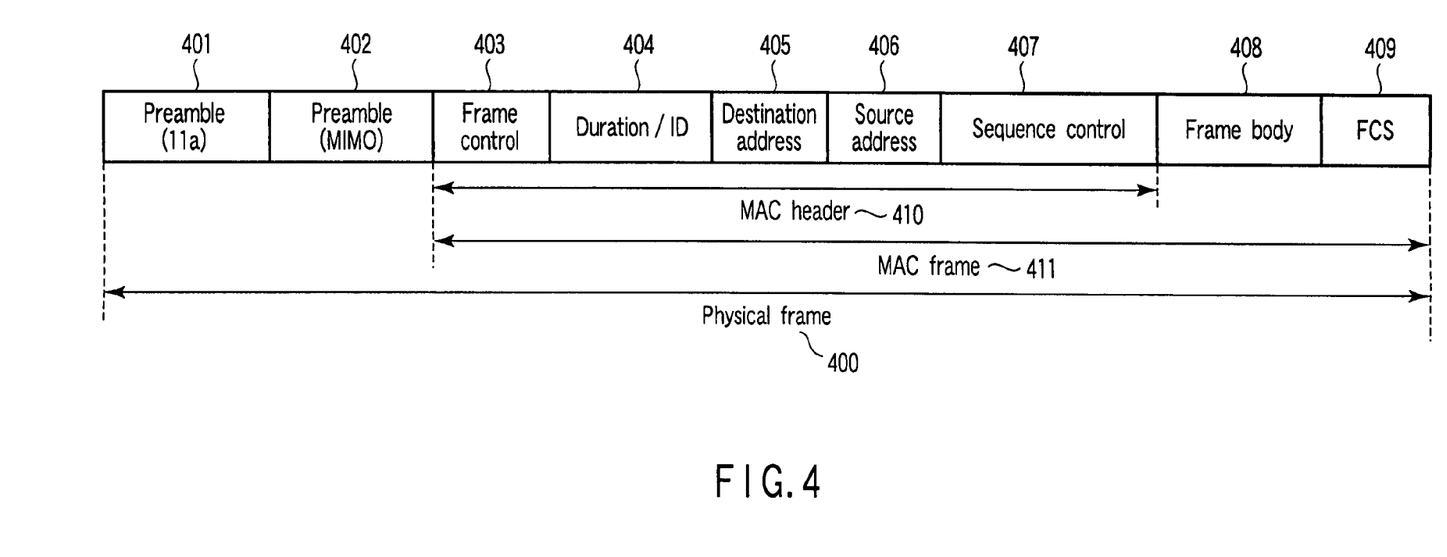
FIG. 4 is a view showing an example of the format of a physical frame according to the first embodiment of the present invention.

FIG. 4 is a view showing a basic example of the physical frame in the first embodiment. The first embodiment of the present invention appropriately modifies and adopts the physical frame shown in FIG. 4. A physical frame 400 is roughly divided into a preamble and MAC frame 411. In the first embodiment, the preamble includes two types of preambles 401 and 402. The preamble 401 is transmitted by the IEEE802.11a communication mode, and the preamble 402 is transmitted by MIMO communication mode. The MAC frame 411 basically has the same frame format as the IEEE802.11a frame format, and is transmitted by the IEEE802.11a communication mode, unless otherwise specified. The MAC frame 411 is different from the IEEE802.11a physical frame in that the MAC frame 411 does not have a field corresponding to the preamble 402. A channel information feedback request frame and channel estimation result information frame (to be described later) are basically generated on the basis of the format of the physical frame 400.

Figure 5:
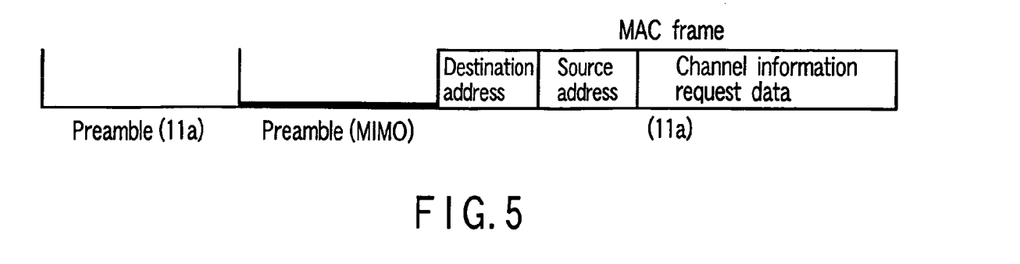
FIG. 5 is a view showing an example of the format of channel information feedback request frame 1 according to the first embodiment of the present invention.

FIG. 5 is a view showing the format of channel information feedback request frame 1. The MAC layer processing unit 100 creates the MAC frame part of a channel information feedback request frame upon reception of a channel information feedback request instruction from the MAC layer management entity 101 (T1). The frame part is sent to the physical layer processing unit 200 which executes encoding defined by IEEE802.11a or encoding used for MIMO transmission (T2). An IEEE802.11a preamble and MIMO preamble are added at the head of the MAC frame (T3), and the PHY frame is transmitted from the antenna 300.

Figure 6:
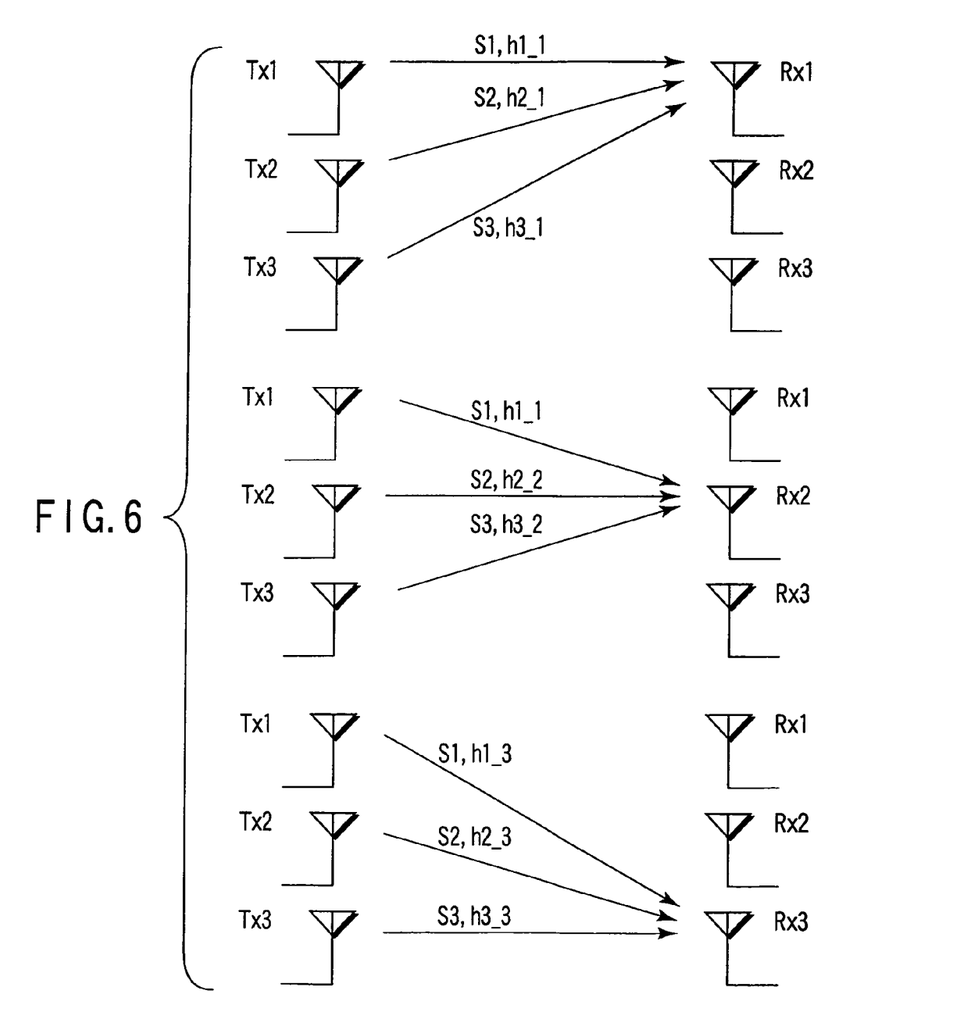
FIG. 6 is a chart for explaining a case in which data may not be reassembled in MIMO depending on the transmission channel environment.

The MAC frame part is transmitted by the IEEE802.11a communication mode, as shown in FIG. 5. FIG. 6 is a chart for explaining a case in which data may not be decoded in MIMO depending on the transmission channel environment. MIMO in which data S1, S2, and S3 are transmitted using three transmission antennas (Tx1, Tx2, and Tx3) as shown in FIG. 6 will be considered. The transmission antenna Tx1 transmits the data S1. Similarly, the transmission antennas Tx2 and Tx3 transmit the data S2 and S3, respectively. The receiver receives the data S1, S2, and S3 by using three reception antennas (Rx1, Rx2, and Rx3). The reception antennas Rx1, Rx2, and Rx3 receive a signal in which the three data S1, S2, and S3 are mixed. When attention is paid to the reception antenna Rx1, a signal r1 received by the reception antenna Rx1 is given by $$r1 = h1\_1*S1 + h2\_1*S2 + h3\_1*S3 \quad \text{Equation (1)}$$

where h1_1, h2_1, and h3_1 are the channel statement information. The channel state between the transmission antenna Tx1 and the reception antenna Rx1 is represented by h1_1. The data S1 transmitted by the transmission antenna Tx1 changes under the influence of the channel state h1_1 during transmission, and is received as S1*h1_1 by the reception antenna Rx1. Similarly, the data S2 and S3 are received as S2*h2_1 and S3*h3_1, respectively.

Similarly, a signal r2 received by the reception antenna Rx2 is given by $$r2 = h1\_2*S1 + h2\_2*S2 + h3\_2*S3 \quad \text{Equation (2)}$$

A signal r3 received by the reception antenna Rx3 is given by $$r3 = h1\_3*S1 + h2\_3*S2 + h3\_3*S3 \quad \text{Equation (3)}$$

Equations (1) to (3) are summarized into:

$$\begin{pmatrix} r1 \\ r2 \\ r3 \end{pmatrix} = \begin{pmatrix} h1\_1 & h2\_1 & h3\_1 \\ h1\_2 & h2\_2 & h3\_2 \\ h1\_3 & h2\_3 & h3\_3 \end{pmatrix} \cdot \begin{pmatrix} S1 \\ S2 \\ S3 \end{pmatrix} \quad \text{Equation (4)}$$

$$= H \cdot \begin{pmatrix} S1 \\ S2 \\ S3 \end{pmatrix}$$

The receiver can separate and extract S1, S2, and S3 from the reception signals r1, r2, and r3 by solving simultaneous equation system (4) as far as a channel state matrix H can be estimated. Estimation of H utilizes a preamble which is added and transmitted together with data. When a MIMO preamble is added to data, the channel state matrix H can be estimated by the receiver. Thus, S1, S2, and S3 can be separated and extracted from the reception signals r1, r2, and r3.

By using the channel state matrix H estimated by the receiver, the transmitter determines an antenna configuration to use when communicating with the receiver (function R6). An example of a method of determining the antenna configuration will be explained.

A method using a correlation coefficient α between paths is conceivable. The correlation coefficient α between paths can be obtained by equation (4) and a channel state estimation result hx_y (x=1, 2, 3, y=1, 2, 3) in FIG. 6. For example, if the hx_y values of two paths are almost equal to each other, the correlation coefficient α between the two paths is high. To the contrary, if the hx_y values of two paths are greatly different from each other, the correlation coefficient α between the two paths is low. In MIMO communication, the receiver may not reassemble a plurality of signals which have been received via paths having a high correlation coefficient α. When the correlation between paths is high, only one path is desirably used. That is, the correlation coefficient α between paths is obtained from the channel estimation result hx_y, and if the correlation coefficient α is higher than a predetermined threshold α_th, one of paths having the high correlation is selected. An unselected path having the high correlation is not used. Accordingly, an antenna used for transmission via the selected path can be determined.

As an example of another method, the CNR (Carrier vs. Noise Ratio) of each path is obtained, and a transmission antenna is selected so that a path having a low CNR is not used. In some cases, it is difficult to reassemble, for respective paths, signals received via paths having low CNRs. For this reason, when the CNR of a given path is lower than a preset threshold CNR_th, the path is set not to be used. The CNR of each path can be obtained by equation (4) and the channel state estimation result hx_y (x=1, 2, 3, y=1, 2, 3) in FIG. 6. Since a path having a large channel estimation result value hx_y also exhibits a high CNR, an antenna configuration can be determined from the channel estimation result value hx_y without actually calculating the CNR. The same determination can be used if the CNR used for determination is replaced with an SNR (Signal vs. Noise Ratio).

Under LOS environment, the signals S1, S2, and S3 transmitted from the transmission antennas Tx1, Tx2, and Tx3 pass through almost the same channel, and the correlation between the reception signals r1, r2, and r3 becomes high. More specifically, $$h1\_1 = h1\_2 = h1\_3$$

$$h2\_1 = h2\_2 = h2\_3$$

$$h3\_1 = h3\_2 = h3\_3$$

The channel state matrix H is given by $$H = (h1\_1 \; h2\_1 \; h3\_1)$$

In this case, equation (4) is rewritten as:

$$\begin{pmatrix} r1 \\ r2 \\ r3 \end{pmatrix} = (h1\_1 \; h2\_1 \; h3\_1) \cdot \begin{pmatrix} S1 \\ S2 \\ S3 \end{pmatrix} \quad \text{Equation (4)}'$$

Since the equation may not be solved, the transmission signals S1, S2, and S3 may not be calculated. Hence, when MIMO is used in the LOS environment, S1, S2, and S3 may not be separated and extracted from the reception signals r1, r2, and r3.

As described above, since there may be a case wherein data may not be reassembled in MIMO depending on the environment, the MAC frame part of channel information feedback request frame 1 is transmitted by the IEEE802.11a instead of MIMO.

Figure 7:
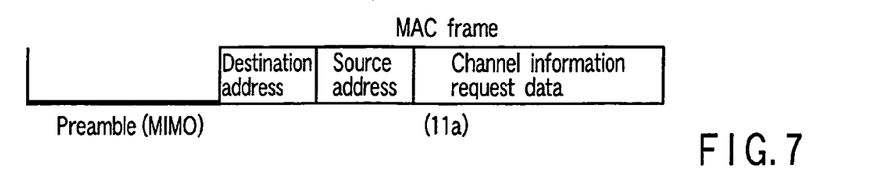
FIG. 7 is a view showing another example of the format of channel information feedback request frame 1.

Note that channel information feedback request frame 1 shown in FIG. 5 may be configured as shown in FIG. 7. In FIG. 7, a format transmitted by the IEEE802.11a communication mode is decoded by using a preamble transmitted by MIMO. When a preamble transmitted by MIMO is used, the channel state can be estimated for possible combinations of antennas, and the channel state of a channel used to transmit a MAC frame can also be obtained. That is, a MAC frame part of a format transmitted by the IEEE802.11a communication mode can be decoded. By using a preamble transmitted by MIMO, a MAC frame of the format transmitted by the IEEE802.11a communication mode can be decoded. The frame as shown in FIG. 7 can be employed in place of channel information feedback request frame 1 in FIG. 5.

The steps of the feedback procedure shown in FIG. 4 will be explained in detail.

<First Step (Transmitter→Receiver)>

Channel information feedback request frame 1 shown in FIG. 5 is transmitted from the transmitter to the receiver. The transmitter transmits a preamble by the IEEE802.11a communication mode using one antenna. The transmitter then transmits a preamble by MIMO communication mode using three antennas. Data which requests feedback of channel information is stored in the MAC frame, and transmitted by using one antenna which has been used to transmit the preamble based on the IEEE802.11a communication mode. In this case, data which requests feedback of channel information may be stored in the header or payload of the MAC frame.

Alternatively, data which requests feedback of channel estimation result information may be added to general application data and transmitted by MIMO by using a data frame instead of channel information feedback request frame 1.

<Second Step (Channel Estimation Process on Receiver)>

The receiver receives channel information feedback request frame 1. The receiver estimates a channel by using the preamble transmitted by the IEEE802.11a communication mode. The receiver then estimates a channel in MIMO communication by using the preamble transmitted by MIMO communication mode. The receiver decodes the MAC frame part on the basis of the channel estimation result using the preamble transmitted by the IEEE802.11a communication mode. This decoded data shows that the transmitter requests feedback of channel estimation result information in MIMO communication. The receiver creates channel estimation result notification frame 2-1 for notifying the transmitter of the channel estimation result in MIMO communication. The channel estimation result is generally expressed by a complex number including the phase and amplitude information. Channel estimation result information to be fed back to the transmitter may be not a complex number itself but simple information. For example, a round number prepared by quantizing a complex number, or a bitmap expressing a good/bad channel state by a true/false value (1/0) may be fed back as channel estimation result information. When a communication apparatus which estimates a channel converts a channel estimation result into summarized information, the process of a communication apparatus which receives the information can be simplified.

<Third Step (Receiver→Transmitter)>

Figure 8:
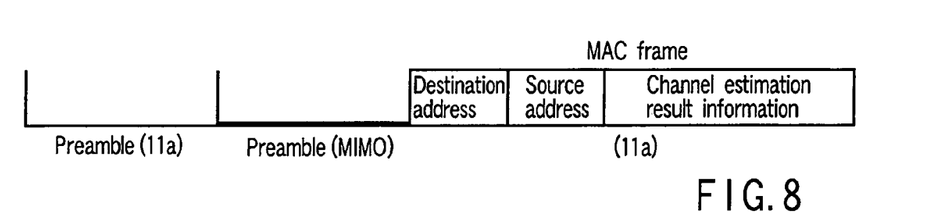
FIG. 8 is a view showing an example of the format of channel estimation result notification frame 2-1 according to the first embodiment of the present invention.

Channel estimation result notification frame 2-2 in MIMO communication is sent back from the receiver to the transmitter. FIG. 8 shows an example of the format. In this step, the receiver transmits a preamble by the IEEE802.11a communication mode using one antenna. The receiver then transmits a preamble by MIMO using three antennas. The receiver stores, in the MAC frame, channel estimation result information in MIMO communication that is obtained in the second step, and transmits the information by using one antenna which has been used to transmit the preamble by the IEEE802.11a communication mode. In this case, data which requests channel estimation result information may be stored in the header or payload of the MAC frame.

In transmitting a preamble and MAC frame, one antenna in a good channel state can also be selected on the basis of the channel estimation result in the second step, and transmitted by the IEEE802.11a communication mode.

In this step, channel estimation result information may be added to general transmission data and transmitted by MIMO by using a data frame instead of channel estimation result notification frame 2-1.

<Fourth Step (Channel Estimation Process on Transmitter)>

The transmitter receives channel estimation result notification frame 2-1. The transmitter estimates a channel by using the preamble transmitted by the IEEE802.11a communication mode. The transmitter then estimates a channel in MIMO communication by using the preamble transmitted by MIMO. The transmitter decodes the MAC frame part by using the channel estimation result based on the preamble of the IEEE802.11a communication mode. This decoded data shows that the receiver has fed back channel estimation result information in MIMO communication. The transmitter determines an antenna configuration in MIMO data transmission. At this time, the channel estimation result in MIMO communication and the channel estimation result in MIMO communication on the receiver that has been fed back from the receiver can be compared to confirm whether these channel estimation results coincide with each other. This process is executed because a channel state from the transmitter to the receiver and a channel state from the receiver to the transmitter may not always coincide with each other due to the difference between the transmitter and the receiver in their configuration. With this process, mismatching in recognition of the channel state between the transmitting and receivers can be recognized before the start of data communication. A communication parameter permissible between the transmitting and receivers can be set.

<Fifth Step (Transmitter→Receiver)>

Figure 9:
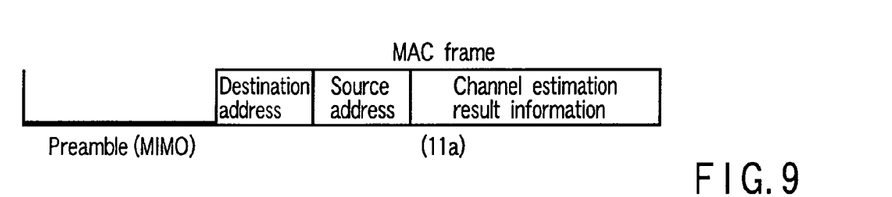
FIG. 9 is a view showing an example of the format of channel estimation result notification frame 3-1 according to the first embodiment of the present invention.
Figure 10:
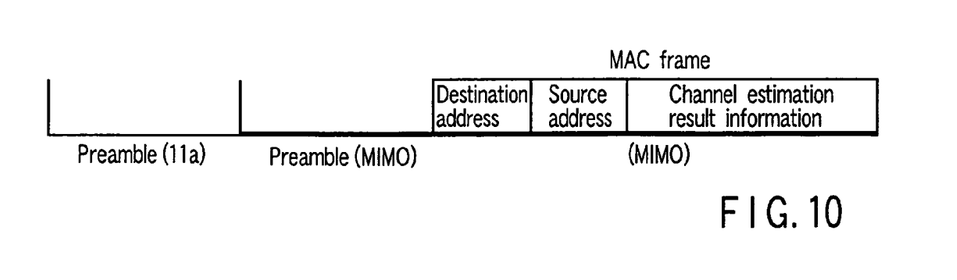
FIG. 10 is a view showing an example of the format of channel estimation result notification frame 3-2 according to the first embodiment of the present invention.
Figure 11:
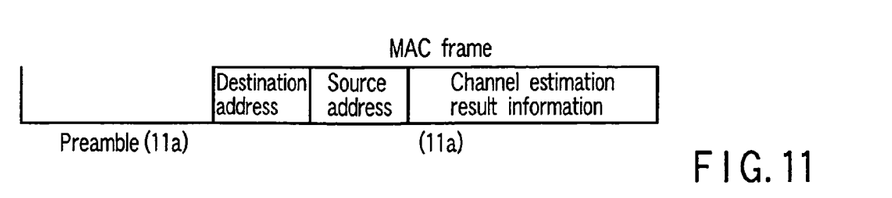
FIG. 11 is a view showing an example of the format of channel estimation result notification frame 3-3 according to the first embodiment of the present invention.

In the fifth step, channel estimation result information obtained on the transmitter in the fourth step is transmitted from the transmitter to the receiver. If it is determined from the channel estimation result fed back from the receiver in the third step that the signal transmitted by MIMO can be correctly decoded by the receiver, channel estimation result notification frame 3-1 or 3-2 is employed. FIG. 9 shows an example of the format of channel estimation result notification frame 3-1, and FIG. 10 shows an example of the format of channel estimation result notification frame 3-2. When channel estimation result notification frame 3-1 or 3-2 is used, the antenna configuration which is determined in the fourth step is adopted. Channel estimation result information obtained on the transmitter in the fourth step are multiplexed to transmit the MAC frame part. If it is determined from the channel estimation result fed back from the receiver in the third step that the signal transmitted by MIMO may not be correctly reassembled by the receiver and information may not be multiplexed and transmitted from a plurality of antennas, channel estimation result notification frame 3-3 is employed. FIG. 11 shows an example of the format of frame 3-3. In this case, MIMO communication may not be executed and only transmission/reception using one antenna can be done. Thus, the MAC frame part which stores channel estimation result information obtained on the transmitter in the fourth step is transmitted from one antenna. Channel estimation result information on the transmitter in the fourth step may be transmitted using frame 2-1 similar to the third step regardless of whether the receiver can correctly reassemble the signal transmitted by MIMO. In the fifth step, channel estimation result information may be added to general transmission data and transmitted by MIMO by using a data frame instead of channel estimation result notification frames 3-1, 3-2, and 3-3.

By executing the first to fifth steps described above, transmitting and receiving communication terminals can recognize their channel estimation results. The transmitter can transmit data by specifying one or more antennas used for transmission so as to allow the receiver to correctly decode information.

According to the first embodiment, in the fourth step, the transmitter determines an antenna configuration for transmission on the basis of the channel estimation result fed back from the receiver. Alternatively, when the receiver estimates a channel, the receiver may determine the antenna configuration on the basis of the channel estimation result, and feed back not the channel estimation result but the antenna configuration to the transmitter.

Second Embodiment

Figure 12:
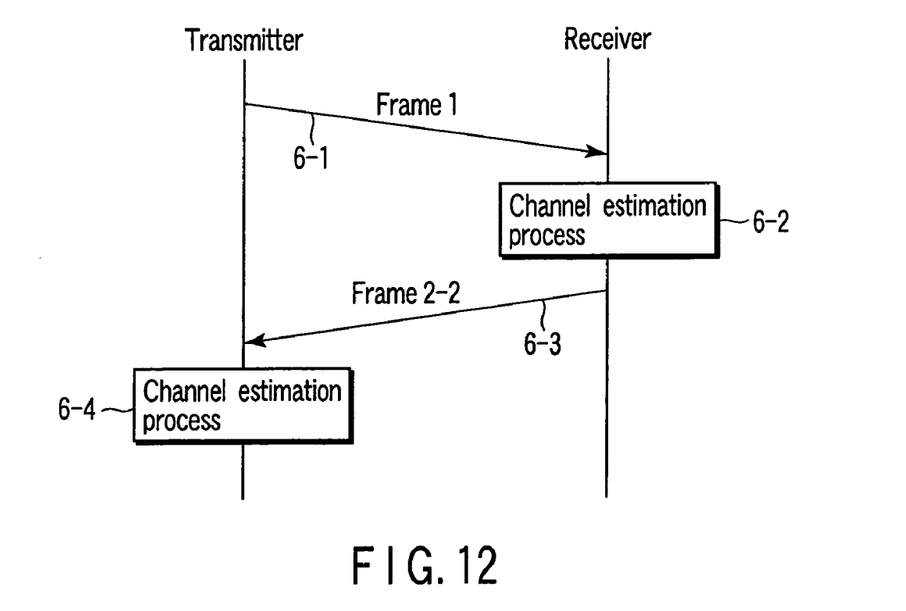
FIG. 12 is a chart showing an example of a communication sequence according to the second embodiment of the present invention.

The second embodiment of the present invention is different from the first embodiment in the communication sequence of feeding back channel information in the same wireless system as that in the first embodiment. In the second embodiment, only a preamble for channel estimation is transmitted to cause a partner side to estimate a channel, instead of transmitting channel estimation result information between the transmitters and receivers. FIG. 12 shows the communication sequence according to the second embodiment.

<First Step (Transmitter→Receiver)>

The first step is the same as that in the first embodiment.

<Second Step (Channel Estimation Process on Receiver)>

The receiver receives channel information feedback request frame 1. The receiver estimates a channel by using the preamble transmitted by the IEEE802.11a communication mode. The receiver then estimates a channel in MIMO communication by using the preamble transmitted by MIMO. The receiver decodes the MAC frame part by using the channel estimation result based on the preamble transmitted by the IEEE802.11a communication mode. This decoded data shows that the transmitter requests feedback of channel estimation result information in MIMO communication. In this step, an antenna configuration to use for transmitting data from the receiver to the transmitter can also be determined on the basis of the channel estimation result in MIMO communication.

<Third Step (Receiver→Transmitter)>

Figure 13:
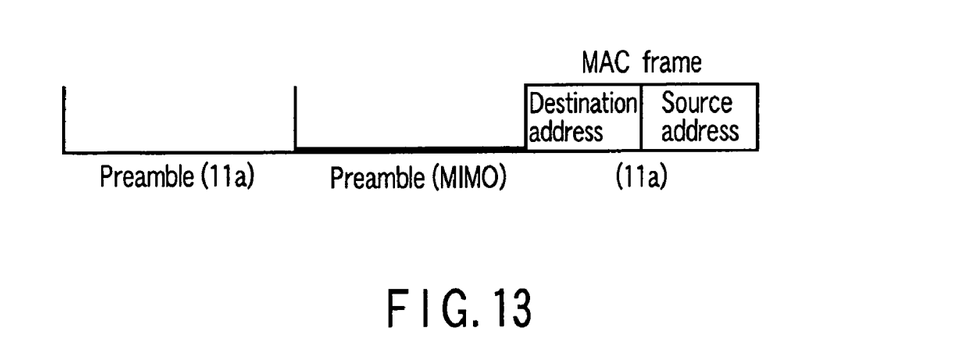
FIG. 13 is a view showing an example of the format of channel estimation result frame 2-2 according to the second embodiment of the present invention.

Channel estimation result frame 2-2 for allowing the transmitter to estimate a channel in MIMO communication is sent back from the receiver to the transmitter. FIG. 13 shows an example of the format of channel estimation result frame 2-2.

The receiver transmits a preamble by the IEEE802.11a communication mode using one antenna. The receiver then transmits a preamble by MIMO using three antennas. The receiver transmits a MAC frame having only a MAC header by using one antenna which has been used to transmit the preamble by the IEEE802.11a communication mode.

The channel estimation result frame to be transmitted may be channel estimation result frame 2-1 as shown in FIG. 8 because the frame suffices to enable channel estimation in MIMO transmission.

In transmitting a preamble by the IEEE802.11a communication mode, one antenna in a good channel state can also be selected and used on the basis of the channel estimation result in the second step.

<Fourth Step (Channel Estimation Process on Transmitter)>

The transmitter receives channel estimation result frame 2-2. The transmitter estimates a channel by using the preamble transmitted by the IEEE802.11a communication mode. The transmitter then estimates a channel in MIMO communication by using the preamble transmitted by MIMO. The transmitter determines an antenna configuration to use for transmission on the basis of the channel estimation result information in MIMO communication.

The second embodiment omits the step of notifying the receiver by the transmitter of the channel estimation result on the transmitter. The second embodiment can reduce the communication overhead of the receiver in comparison with the first embodiment.

Third Embodiment

Figure 14:
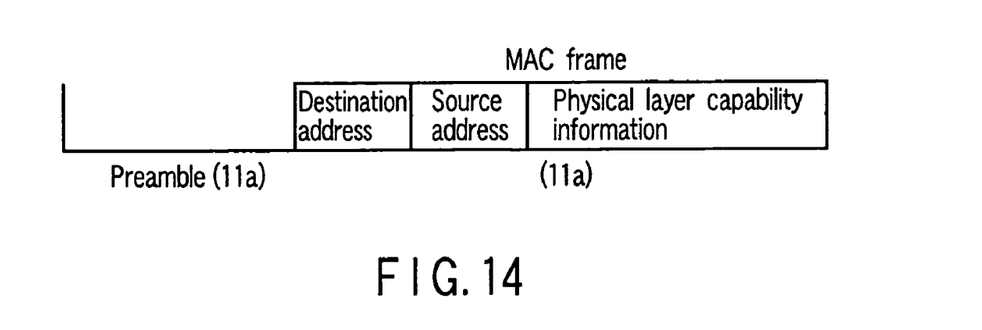
FIG. 14 is a view showing an example of the format of a physical layer capability information notification frame according to the third embodiment of the present invention.

The third embodiment of the present invention performs a preparatory step prior to the first step in the same wireless system as that of the first or second embodiment. In the preparatory step, physical layer capability information such as the numbers of antennas on the transmitting and receivers are exchanged between the two sides by using a physical layer capability information notification frame in FIG. 14. The channel estimation result information part of the MAC frame in the physical layer capability information notification frame stores not the channel estimation result but physical layer capability information such as the number of antennas of the apparatus. The preparatory step is executed to obtain information such as the numbers of antennas on the transmitters and receivers. The preamble of a physical header can be added to the MAC frame so as to enable channel estimation in MIMO communication corresponding to the number of antennas. In the first to fifth steps executed after the preparatory step, a preamble used in MIMO communication that is set to a length and format necessary for channel estimation in MIMO communication can be used in the physical layer capability information notification frame from channel information feedback request frame 1.

In place of the preparatory step, physical layer capability information such as the AP (Access Point) or the number of antennas of each terminal may be stored in a beacon frame transmitted by the AP, and transmitted to terminals present within the BSS (Basic Service Set) of the AP. Alternatively, physical layer capability information of each terminal may be stored in a probe request frame or probe response frame circumferentially broadcasted by the terminal, and transmitted to peripheral terminals. Physical layer capability information of each terminal may be stored in an association request frame from the terminal or an association response frame from the AP, and transmitted to peripheral terminals.

By any method, each terminal can obtain the physical layer capability of a counterpart in advance. In executing the first to fifth steps, the preamble of a physical layer capability information notification frame used in MIMO communication can be set to a length and format corresponding to the physical layer capabilities of partner terminals from channel information feedback request frame 1.

In accordance with the above described embodiments, a receiving communication apparatus estimates a channel state representing a reception characteristic in MIMO communication, and the channel state estimation information is fed back to a transmitting communication apparatus. The transmitting communication apparatus can properly determine an antenna configuration to be used for transmission on the basis of the channel state estimation information fed back from the receiving communication apparatus.

Therefore, a situation in which communication starts by using MIMO though the channel state is bad and MIMO communication is impossible can be avoided. This can prevent waste of the band of the communication channel owing to a possible communication error.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication method for exchanging channel information between a transmitter and a receiver each including a plurality of antennas, the method comprising:
   constructing, at the transmitter, a first frame including a first preamble field and a first data field, the first preamble field being generated based on a physical layer protocol and having a first preamble and a second preamble, wherein the first preamble is defined by IEEE802.11a and the second preamble is constructed by a plurality of signals for estimating channel information, and the first data field being generated based on a MAC layer protocol and including a channel information feedback request;

transmitting the first frame to the receiver, wherein the first preamble is transmitted from at least one of the plurality of antennas of the transmitter, each of the plurality of signals in the second preamble is transmitted from each of the plurality of antennas of the transmitter, and the first data field is transmitted from the at least one of the plurality of antennas of the transmitter;

receiving the first frame at the receiver, wherein the first preamble is received from at least one of the plurality of antennas of the receiver, each of the plurality of signals in the second preamble is received from each of the plurality of antennas of the receiver, and the first data field is received from the at least one of the plurality of antennas of the receiver;

estimating channel information, using the second preamble at the receiver;

detecting, at the receiver, the channel information feedback request by decoding the first data field based on the estimated channel information;

constructing, at the receiver, a second frame including a second preamble field and a second data field, the second preamble field being generated based on the physical layer protocol and having one of a third preamble, the third preamble and a fourth preamble, or the fourth preamble, wherein the third preamble is defined by IEEE802.11a and the fourth preamble is constructed by a plurality of signals, and the second data field being generated based on the MAC layer protocol and including the estimated channel information;

transmitting the second frame to the transmitter, each of the plurality of signals in the fourth preamble is transmitted from each of the plurality of antennas of the receiver; and receiving the second frame at the transmitter, the second frame being a response to the first frame.

2. The method according to claim 1, further comprising:
estimating another channel information at the transmitter when the second preamble field includes the fourth preamble;

constructing, at the transmitter, a third frame including a third preamble field and a third data field, the third preamble field being generated based on the physical layer protocol and being constructed by a plurality of signals, and the third data field being generated based on the MAC layer protocol and including the estimated another channel information; and transmitting the third frame to the receiver, wherein the plurality of signals in the third preamble field is transmitted from each of the plurality of antennas of the transmitter.

3. The method according to claim 1, further comprising:
determining by the transmitter a channel configuration to use when communicating with the receiver, based on the channel information received from the receiver.

4. The method according to claim 3, wherein the channel configuration is realized by using one of the plurality of antennas, a part of the plurality of antennas, or all of the plurality of antennas.

5. The method according to claim 3, wherein the receiver receives transmission from the transmitter by using the plurality of antennas.

6. A communication apparatus for communicating with a receiver, comprising:
a plurality of antennas;
a frame constructor configured to construct a first frame including a first preamble field and a first data field, the first preamble field being generated based on a physical layer protocol and having a first preamble and a second preamble, wherein the first preamble is defined by IEEE802.11a and the second preamble is constructed by a plurality of signals for estimating channel information, and the first data field being generated based on a MAC layer protocol and including a channel information feedback request;
a transmission unit, coupled to the plurality of antennas, to transmit the first frame, wherein the first preamble is transmitted from at least one of the plurality of antennas, each of the plurality of signals in the second preamble is transmitted from each of the plurality of antennas, and the first data field is transmitted from the at least one of the plurality of antennas; and
a reception unit, coupled to the plurality of antennas, to receive a second frame, the second frame being a response to the first frame and including a second preamble field and a second data field, the second preamble field being generated based on the physical layer protocol and having one of a third preamble, the third preamble and a fourth preamble, or the fourth preamble, wherein the third preamble is defined by IEEE802.11a and the fourth preamble is constructed by a plurality of signals, and wherein the plurality of signals in the fourth preamble is received from each of the plurality of antennas, and the second data field being generated based on the MAC layer protocol and including channel information estimated at the receiver using the second preamble.

7. The apparatus according to claim 6, further comprising a determination unit configured to determine a configuration of the second preamble field used in communication with the receiver.

8. A communication apparatus for communicating with a transmitter, comprising:
a plurality of antennas;
a reception unit, coupled to the plurality of antennas, to receive a first frame including a first preamble field and a first data field, the first preamble field being generated based on a physical layer protocol and having a first preamble and a second preamble, wherein the first preamble is defined by IEEE802.11a and the second preamble is constructed by a plurality of signals for estimating channel information, and the first data field being generated based on a MAC layer protocol and including a channel information feedback request, wherein the first preamble is received from at least one of the plurality of antennas, each of the plurality of signals in the second preamble is received from each of the plurality of antennas, and the first data field is received from the at least one of the plurality of antennas;
a channel estimator coupled to the reception unit and configured to estimate channel information, using the second preamble;
a detection unit coupled to the channel estimator and configured to detect the channel information feedback request by decoding the first data field based on the estimated channel information;

a frame constructor coupled to the channel estimator and the detection unit and configured to construct a second frame including a second preamble field and a second data field, the second preamble field being generated based on the physical layer protocol and having one of a third preamble, the third preamble and a fourth preamble, or the fourth preamble, wherein the third preamble is defined by IEEE802.11a and the fourth preamble is constructed by a plurality of signals, and the second data field being generated based on the MAC layer protocol and including the estimated channel information; and a transmission unit, coupled to the plurality of antennas, to transmit the second frame to the transmitter, the plurality of signals in the fourth preamble is transmitted from each of the plurality of antennas.

9. A communication system for exchanging channel estimation information, and comprising first and second communication apparatuses each capable of communication complying with a single-input/single-output first physical layer protocol and communication complying with a multi-input/multi-output second physical layer protocol, the first communication apparatus including a first transmission unit which transmits a physical frame for requesting, of the second communication apparatus, first channel estimation information containing information on a reception state of the second communication apparatus in communication with the first communication apparatus by using the second physical layer protocol, the physical frame including:

a first preamble field and a first data field, the first preamble field having a first preamble and a second preamble, the first preamble being transmitted on the basis of the first physical layer protocol and being defined by IEEE802.11a, the second preamble being transmitted on the basis of the second physical layer protocol, and the first data field including a channel information feedback request, and the second communication apparatus including:

a channel estimation unit which estimates first channel information, using the second preamble;

a detection unit which detects the channel information feedback request by decoding the first data field based on the estimated first channel information, and a second transmission unit which transmits the first channel estimation information obtained by the channel estimation unit to the first communication apparatus.

10. The system according to claim 9, wherein the second transmission unit transmits at least a part of the physical frame containing the first channel estimation information based on the second physical layer protocol.

11. The system according to claim 9, wherein the first communication apparatus further comprises a channel estimation unit which obtains, on the basis of a second preamble transmitted by the second physical layer protocol received from the second communication apparatus together with the first channel estimation information, second channel estimation information containing information on a reception state of the first communication apparatus in communication with the second communication apparatus by using the second physical layer protocol, and a notification unit which notifies the second communication apparatus of the second channel estimation information.

12. The system according to claim 9, wherein the first communication apparatus further comprises a unit which determines, on the basis of the first channel estimation information received from the second communication apparatus, a transmission condition used to transmit the physical frame by the second physical layer protocol, and notifies the communication unit of the transmission condition.

13. The system according to claim 12, wherein the transmission condition includes antenna configuration specifying a number of antennas used in communication with the second communication apparatus by using the second physical layer protocol.

* * * * *